United States Patent
Narasimhan et al.

(10) Patent No.: US 9,386,427 B1
(45) Date of Patent: Jul. 5, 2016

(54) COMMUNICATION MANAGEMENT BASED ON COMMUNICATION EVENTS

(75) Inventors: Subram Narasimhan, Saratoga, CA (US); Girish Bausilal Bajaj, Bellevue, WA (US); Kenneth P. Kiraly, Menlo Park, CA (US); Jeffrey P. Bezos, Greater Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1264 days.

(21) Appl. No.: 12/180,325

(22) Filed: Jul. 25, 2008

(51) Int. Cl.
*H04W 4/02* (2009.01)
*H04W 4/14* (2009.01)

(52) U.S. Cl.
CPC . *H04W 4/14* (2013.01); *H04W 4/02* (2013.01)

(58) Field of Classification Search
CPC .......... G06Q 30/0252; G06Q 30/0261; G06Q 50/01; H04W 4/02; H04W 4/027; H04W 4/20; H04W 12/06; H04W 48/18; H04W 4/021; H04W 4/06; H04W 4/185; H04W 68/00; H04W 76/007; H04L 63/20; H04L 63/107
USPC ............. 455/456.1–456.6, 414.1, 432.2, 466, 455/412.2
See application file for complete search history.

(56) References Cited

U.S. PATENT DOCUMENTS

| | | | | |
|---|---|---|---|---|
| 8,478,342 B2* | 7/2013 | Vedantham | ............ | H04B 7/024 455/452.1 |
| 8,542,640 B2* | 9/2013 | Ramprashad | ......... | H04W 16/10 370/329 |
| 8,787,302 B2* | 7/2014 | Balachandran | ........ | H04B 7/024 370/329 |
| 2004/0203918 A1* | 10/2004 | Moriguchi et al. | ........ | 455/456.1 |
| 2008/0014966 A1* | 1/2008 | Chakraborty | ....... | H04M 1/7253 455/456.4 |
| 2008/0305808 A1* | 12/2008 | Chan | ....................... | H04W 4/02 455/456.1 |
| 2009/0006308 A1* | 1/2009 | Fonsen | .............. | G06F 17/30902 |
| 2009/0024601 A1* | 1/2009 | Zmolek | ............................. | 707/4 |
| 2009/0170532 A1* | 7/2009 | Lee | .................... | H04M 1/72566 455/456.3 |
| 2009/0176512 A1* | 7/2009 | Morrison | .................... | 455/456.6 |
| 2010/0217644 A1* | 8/2010 | Lyle | ............... | G06Q 10/063116 705/7.16 |
| 2011/0069143 A1* | 3/2011 | Beers | .................... | H04M 3/567 348/14.12 |
| 2011/0144905 A1* | 6/2011 | Tahara | ................... | G01C 21/26 701/533 |
| 2011/0300846 A1* | 12/2011 | Chiu | ....................... | H04W 8/18 455/418 |
| 2014/0109152 A1* | 4/2014 | Christensen | ....... | H04N 7/17318 725/58 |
| 2014/0143704 A1* | 5/2014 | Luu et al. | ...................... | 715/774 |

\* cited by examiner

*Primary Examiner* — Khawar Iqbal
(74) *Attorney, Agent, or Firm* — Knobbe, Martens, Olson & Bear, LLP

(57) ABSTRACT

A wireless device management environment may include various systems, methods and computer-readable media for managing communications based on a determination of communication events. The communication events correspond to the anticipated unavailability for a wireless device to exchange information via a wireless communication network. Wireless devices collect wireless device information and user event information that can include performance metrics, location information, user interaction information and/or additional information. A data processing component, on the wireless device and/or on a network-based communication management system, processes the wireless device information and user event information to determine communication events. Based on a determination of a communication event, the wireless device can exchange information with the communication management system, which can include the transmission of a set of data to the wireless device, in advance of the anticipated wireless device communication unavailability.

71 Claims, 9 Drawing Sheets

COMMUNICATION MANAGEMENT BASED ON COMMUNICATION EVENTS

BACKGROUND

Generally described, computing devices and communication networks facilitate the collection and exchange of information. In a common application, computing devices, such as personal computing devices, can utilize a wide area communication network, generally referred to as the Internet, to access content, or other data, from other computing devices associated with content providing entities. The type of content exchanged between the computing devices can vary according to the specific design/function of the computing device and the type of content provided by the content providing entity.

In one application, users can request data from a content providing entity that is delivered to the computing device in a relatively "real time" basis. For example, users can request content from a network resource (e.g., a Web site) for immediate rendering on a computing device display screen or they can request the immediate transfer of content, such as a document or data file, from a network resource or Web service for storage on the computing device. In another example, users can transmit a request, or initiate a transaction, that results in the downloading or streaming of content to a computing device. Typically, the content providing entity would initiate such a transfer upon receipt of the request from the computing device.

In another application, the data transmission from the content providing entity to the computing device can be scheduled for delivery to the computing device at a specific time or upon satisfaction of a scheduling event. For example, users can specify a time, or other event, to receive software updates provided by a content providing entity. In another example, users can specify a specific time to receive content or updates to previously delivered content such as periodicals, content posted on a network resource such as web logs, bulletin boards, and the like. In still a further application, content providing entities can initiate data deliveries to the computing device without requiring a prior request from the receiving computing device. For example, a content providing entity may wish to schedule the delivery of advertisement content to a set of personal computing devices.

In one embodiment, wireless computing devices can access content from content providing entities via a communication network. In such an embodiment, the wireless computing device is generally a portable device that includes communication hardware and software components that establish a wireless network connection for exchanging data, such as a cellular-based wireless network connection. Because of the nature of wireless network connections, the quality and availability of the wireless network connection experienced by the wireless device can vary. Factors that can influence such quality and availability include physical obstructions (e.g., natural geographical obstructions/structures, manmade structures and impediments, etc.), legal or administrative limitations to the use of wireless communication networks (e.g., limited or no wireless communications in hospitals and airplanes), wireless network service provider limitations (e.g., wireless network coverage), user-initiated actions (e.g., shutting off the device or disabling the wireless communication network functionality), and the like. At times when wireless communication is unavailable for the reasons described above, scheduled data transfers from a content providing entity or content providing entity initiated data transfers are no longer possible.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
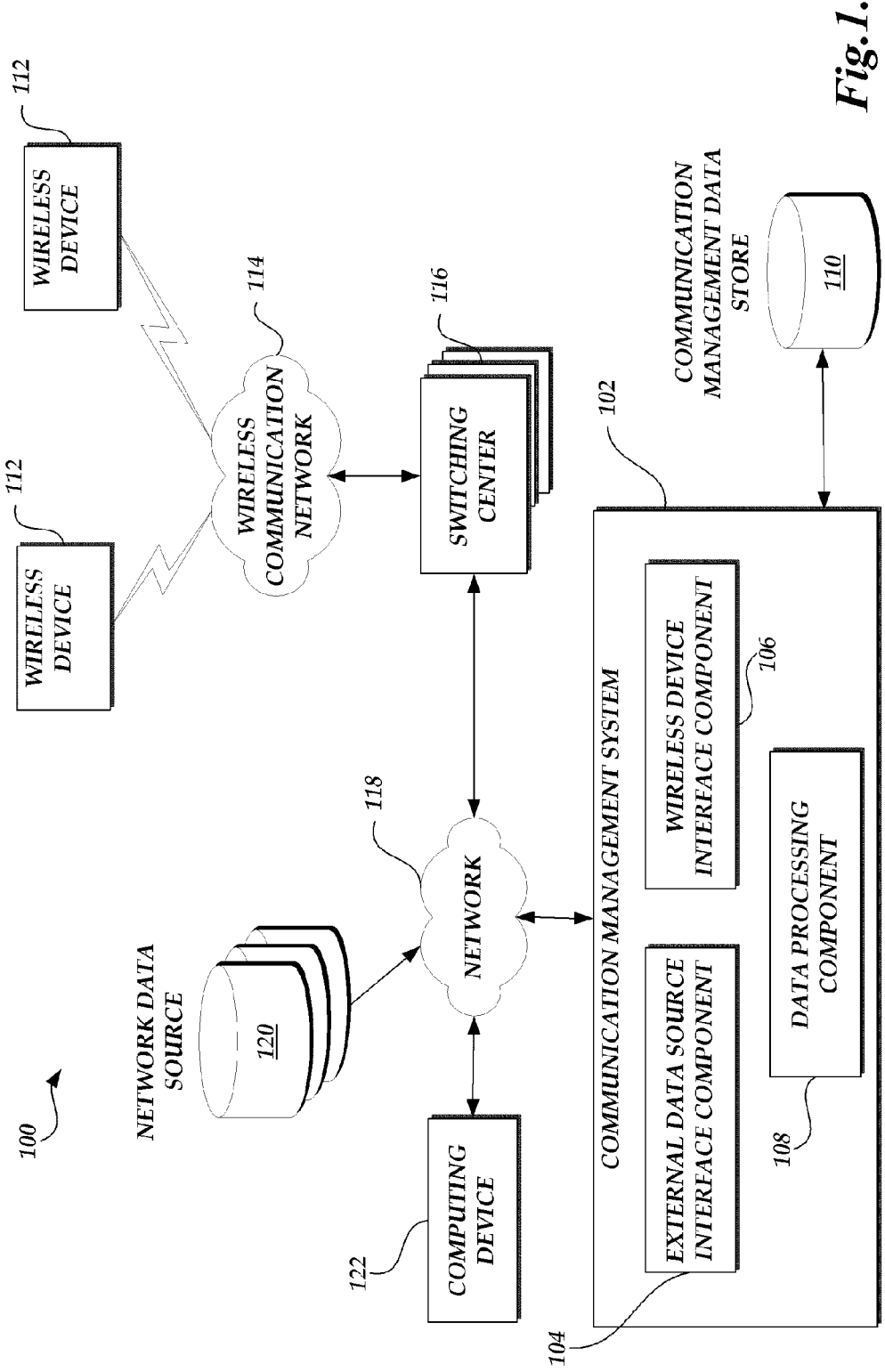
FIG. 1 is a block diagram illustrative of a wireless device communication environment for use in determining anticipated wireless device communication events and transmitting a set of data based on anticipated wireless device communication events.

Generally described, aspects of the present disclosure relate to the management of device communication. Specifically, aspects of the present disclosure relate to the management of data communications to wireless devices based on communication events corresponding to the anticipated unavailability of wireless devices to exchange information with network-based components over a wireless communication network. The communication events are determined by data processing components on a wireless device or on a network-based communication management system as a function of collected wireless device information and/or collected user event information. As used herein, the information utilized by a data processing component in the determination of such communication events will be collectively referred to as "wireless device information and user event information." However, reference to "wireless device information and user event information" should not be construed to imply any limitation as to any singular wireless device information, any singular user event information, or any combination of wireless device information and/or user event information. Additionally, reference to "wireless device information and user event information" will not necessarily be limited to particular types of wireless device information or user event information or to the illustrative examples of wireless device information and/or user event information described in the present disclosure.

In one illustrative embodiment, wireless devices collect wireless device information that can include performance metrics of the wireless device, such as power supply levels, power consumption rates, wireless communication network signal strength, geographic locations of the wireless device, ambient temperature, and the like. In another illustrative embodiment, wireless devices collect wireless device information and user event information that can include user interactions with the wireless device, such as powering down the wireless device, disabling radio communication functionality, placing the wireless device in a limited communication mode, and the like. In still a further embodiment, wireless devices also collect, or are otherwise associated with, user event information that can include additional information associated with an identified user, such as user profile information, user preference information, user calendaring information, and the like. The collected wireless device information and user event information can be processed and used to determine communication events corresponding to anticipated unavailability of the wireless device to exchange information via the wireless communication network.

As previously described, in an illustrative embodiment, the wireless devices can include a data processing component that processes the wireless device information and user event information to determine communication events corresponding to anticipated unavailability for the wireless device to exchange information via the wireless communication network. Additionally, a communication management system can provide a network-based data processing component for processing the wireless device information and user event information to determine communication events. The network-based data processing component may work in conjunction with the data processing component of the wireless device or as an alternative to the data processing component of the wireless device.

In either case, the data processing components can utilize communication event processing criteria that establish, or are used to establish, anticipated communication events. For example, the data processing components can maintain performance metric thresholds that can define anticipated communication events. In another example, the data processing components can utilize defined geographic location or geospatial area processing criteria that identify areas of anticipated communication events in combination with other wireless device or user event information. In a further example, the data processing components can maintain data models of previous communication events and the wireless device information and user event information that facilitated such a determination, including a sequence of wireless device information and user event information. The data processing components can then utilize the data models in making future determinations of communication events by matching collected wireless device information and user event information with the wireless device information and user information from the data models.

In the event a data processing component determines a communication event, the data processing component can then initiate the exchange of data between the wireless device and the communication management system in an attempt to facilitate the additional exchange of data prior to an actual unavailability to exchange information. The exchange can include the transfer of data from the wireless device to a network location, such as the communication management system. For example, the wireless device can transmit data (such as user generated documents/tags/annotations), electronic communications (e.g., electronic mail, short message service (SMS) messages, etc.), wireless device performance information, wireless device diagnostic information, and the like.

The exchange can also include the transfer of a set of data to the wireless device, which can include zero or more pieces of data. The set of data can correspond to data/information (e.g., singular or plural) scheduled to be transferred at a time corresponding to the anticipated communication event (e.g., a time in which the wireless device may be unavailable to receive the scheduled information via the wireless communication network). The set of data can also correspond to data/information that may be identified to be transferred upon detection of a communication event (e.g., content corresponding to the subject matter of a scheduled calendar event or advertisement content based on the communication event). In the event that no additional data will be transmitted to the wireless device, the set of data can be an empty set, or no data. In an illustrative embodiment, the set of data can include, but is not limited to, content to be generated on the wireless device (e.g., electronic publications), software application downloads or software application updates to be executed or stored on the wireless device, multi-media data, and the like.

By way of an illustrative example, assume a user has a wireless device, such as an electronic book reader device, that can receive content from various content providing entities over a wireless communication network. While the wireless device is in communication with the wireless communication network, content may be exchanged between the content providing entity and the wireless device. For example, a content providing entity, such as a content publisher or content providing service, may attempt to transmit electronic books to the electronic book reader device upon receipt of a user request/order, or as soon as the content becomes available. Additionally, the content providing entity can also schedule the delivery of a subset of content, such as periodicals, web logs, or content updates based upon a specific time of day or upon completion of a triggering event (e.g., the close of the stock market trading day). However, if the data processing component anticipates that the wireless device will be unable to communicate via the wireless communication network to content providing entities, such as at a scheduled time, the data processing component may initiate the transmission and exchange of content prior to the anticipated unavailability. More specifically, the data processing component utilizes wireless device information and event information to determine a communication event corresponding to an anticipated unavailability of the wireless device to exchange information. Upon determining the anticipated unavailability, a communication management system component and the wireless device exchange data or information without action by the user. The practical impact to the wireless device user is that the data is exchanged prior to the anticipated unavailability event (e.g., no communication path).

In one example, a user may be required to disable the wireless communication functionality of the wireless device during a scheduled airline flight. Responsive to a determination of a communication event, the wireless device would exchange information via the wireless communication network to transmit any content (e.g., annotations to a publication being edited by the user), receive scheduled content (e.g., a daily report of business news), and/or receive additional content (e.g., the next book in a series based on the user's reading of the current book) prior to disabling the communications for the flight. The determination of such a communication event can be made by the data processing component using wireless device information and user event information such as proximity of the wireless device to an airport, polled user calendaring and profile information, and other wireless device or user event information. In a more specific example, the wireless device's proximity to a geospatial area associated with an airport could be indicative of the potential that the user will be traveling. Additionally, because the user's calendar indicates a calendar event lasting 4 hours and/or a user's travel profile indicates the user has an airline reservation, the data processing component makes a communication event determination based on the combination of the two distinct pieces of wireless device information and user event information. In one embodiment, such determination is made by the data processing component and the data is exchanged with the wireless device without any additional involvement or activities by the user. Accordingly, the additional content obtained in response to the communication event will be transferred to the wireless device prior to the airline flight so that it may be available to the user of the wireless device during the airline flight.

In another example, a user may also plan to or normally disable the wireless communication functionally during a scheduled meeting such that the wireless device will not be able to receive content via the wireless communication network during the meeting. In this example, the user may want to receive any content related to an upcoming meeting with a financial team prior to disabling the wireless communication functionality of the device. Responsive to a determination of a communication event and prior to the unavailability of the wireless device to exchange information, the wireless device can exchange information via the wireless communication network to transmit any content (e.g., user defined meeting agenda), receive scheduled content (e.g., the most up-to-date financial information), and/or receive additional content (e.g., any content corresponding to keywords associated with the upcoming meeting). As described in the above example, the determination of such a communication event can be made by the data processing component using wireless device information and user event information, such as polled user calendaring and profile information, to identify the specific meeting (e.g., by extracting subject headings from the calendar event data). Additionally, to identify data responsive to the determined communication event, the data processing component can further utilize the extracted subject matter headings from the calendar event data to initiate a search for the relevant content. Still further, the data processing component can utilize past user content requests stored in a user profile to identify the most relevant content to transmit to the wireless device. Thus, the additional content obtained in response to the communication event will be transferred to the wireless device so that it may be available to the user of the wireless device during the meeting.

In still a further example, a user has a pattern of placing a wireless device into a limited communication mode while at a particular destination, such as a beach location, park, ferry terminal, etc. Still further, while at the particular destination, the user has a pattern of requesting electronic content related to learning a foreign language (e.g., Learning Spanish). Responsive to a determination of a communication event and prior to the unavailability of the wireless device to exchange information, the wireless device can exchange information via the wireless communication network to transmit any content (e.g., completed worksheets or self-tests), receive scheduled content (e.g., graded work or new worksheets/self-tests), and/or receive additional content (e.g., recommendations for a foreign language dictionary electronic book). As described in the above examples, the determination of such a communication event can be made by the data processing component using wireless device information and user event information, such as user calendaring information, user profile information, wireless device geographic location information or other information. For example, a data processing component can detect proximity to the destination (e.g., the beach location), and in conjunction with calendaring information or historical behavior information, anticipate the unavailability of the wireless device to exchange information with network resources. Additionally, the communication management system can further utilize user profile information (e.g., user history of ordering/reading foreign language titles) to provide the user (via the wireless device) with recommendations/suggestions of additional available content that could be ordered/requested prior to the anticipated unavailability of the wireless device to exchange data.

Although aspects of the present disclosure will be described with regard to an illustrative wireless communication device environment and component interactions, wireless communication protocols, flow diagrams and screen displays, one skilled in the relevant art will appreciate that the disclosed embodiments are illustrative in nature and should not be construed as limiting. Specifically, although the term wireless device is used in this document, the term represents any type of device having a component for communicating with one or more other devices via one or more communication paths. Such communication paths can include wireless communication paths (via infra-red, RF, optical, terrestrial, or satellite communication media) and wired communication paths.

With reference now to FIG. 1, a block diagram illustrative of a wireless device management environment 100 for managing wireless device communications will be described. As illustrated in FIG. 1, the communication management system 102 can include an external data source interface component 104 for obtaining external information from network-based resources, such as information corresponding to a user associated with the wireless device. The communication management system 102 can also include a wireless device interface component 106 for obtaining wireless device information and user event information from a variety of wireless devices. The communication management system 102 can further include a data processing component 108 for processing the wireless device information and user event information and the additional information to determine communication events based on anticipated unavailability for the wireless device to exchange information via the wireless communication network. The data processing component 108 can also obtain requests for data as a function of the determined communication event. The communication management system 102 can further be associated with a communication management data store 110 for storing information obtained by the interface components 104, 106 and/or utilized by the data processing component 108 as will be explained in greater detail below.

One skilled in the relevant art will appreciate that the communication management system 102 may correspond to a number of computer devices, such as server computing devices. Additionally, the external data source interface component 104, wireless device interface component 106, and data processing component 108 may be implemented in a single computing device or across multiple computing devices. Likewise, although the communication management data store 110 is illustrated as local to the communication management system 102, the data store 110 can correspond to a distributed data store and/or network-based data store. One skilled in the relevant art will also appreciate that the communication management system 102 may include any one of a number of additional hardware and software components that would be utilized in the illustrative computerized network environment to carry out the illustrative functions of the system 102 and/or any of the individually identified components.

With continued reference to FIG. 1, the wireless device management environment 100 can include a number of wireless devices 112. The wireless devices 112 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, mobile telephones, modems, personal digital assistants, laptop computers, gaming devices, and the like. In an illustrative embodiment, the wireless devices 112 include a wide variety of software and hardware components for establishing communications over one or more communication networks, including wireless communication network 114 or a wired communication network (not shown). Illustrative components of a wireless device 112 will be described in greater detail with regard to FIG. 2.

In an illustrative embodiment, the wireless device management environment 100 can include a number of additional components, systems and/or subsystems for facilitating communications with the wireless devices 112 and/or the communication management system 102. The additional components can include one or more mobile switching centers 116 for establishing communications with the wireless devices 112 via the wireless communication network 114, such as a cellular radio access network, a wireless network based on the family of IEEE 802.11 technical standards ("WiFi"), a wireless network based on IEEE 802.16 standards ("WiMax"), and other wireless networks. The operation of mobile communication networks, such as wireless communication network 114 are well known and will not be described in greater detail. As illustrated in FIG. 1, the mobile switching center 116 includes interfaces for establishing various communications via a communication network 118, such as the Internet, intranets, private networks and point to point networks, generally referred to as the "network." Although the wireless communication network 114 is illustrated as a single communication network, one skilled in the relevant art will appreciate that the communication network can be made up of any number of public or private communication networks and/or network connections.

The wireless device management environment 100 can further include one or more network data source components 120 for providing external information corresponding to aspects of the wireless devices 112. The network data source components 120 may include a number of computing devices for obtaining and processing requests for information from either the communication management system 102 and/or the wireless devices 112. Additionally, wireless device management environment 100 can further include a number of computing devices 122 for transmitting information via the communication network 118 to the communication management system 102 and/or the wireless devices 112. In an illustrative embodiment, the computing devices 122 can include various hardware and/or software components, such as a browser software application or another software application, for configuring, monitoring, or maintaining anticipated wireless device communication unavailability information.

Figure 2:
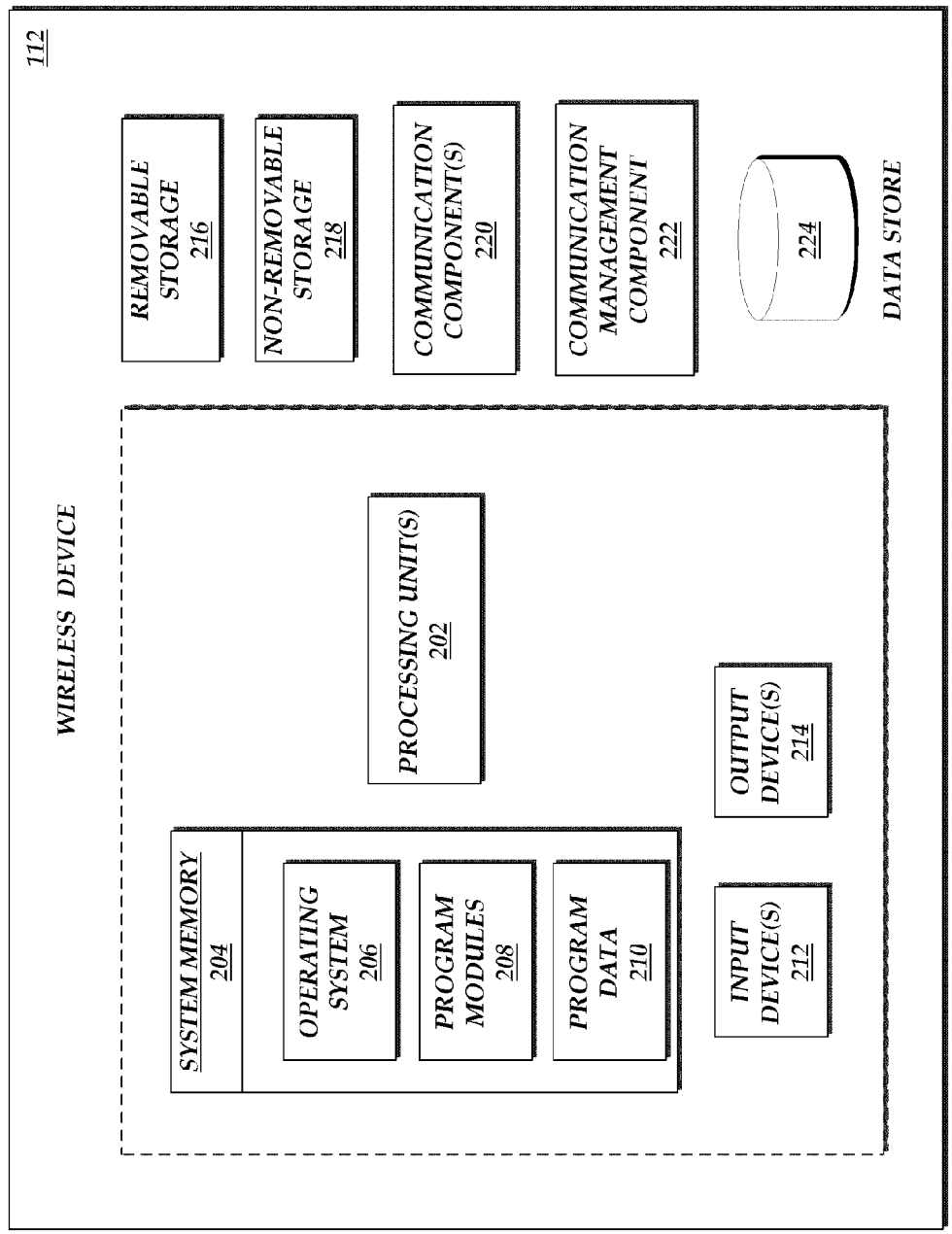
FIG. 2 is a block diagram illustrative of components of a wireless device for use in determining anticipated wireless device communication events and transmitting a set of data based on anticipated wireless device communication events.

With reference now to FIG. 2, illustrative components of a wireless device 112 for use in determining anticipated wireless device communication unavailability and transmitting a set of data based on anticipated wireless device communication unavailability will be described. The wireless device 112 may include one or more processing units 202, such as one or more CPUs. The wireless device 112 may also include system memory 204, which may correspond to any combination of volatile and/or non-volatile storage mechanisms. The system memory 204 may store information which provides an operating system component 206, various program modules 208, program data 210, and/or other components. The wireless device 112 performs functions by using the processing unit(s) 202 to execute instructions provided by the system memory 204. The wireless device 112 may also include one or more input devices 212 (keyboard, mouse device, specialized selection keys, etc.) and one or more output devices 214 (displays, printers, audio output mechanisms, etc.). An illustrative screen rendering for a wireless device 112 will be described with regard to FIGS. 7 and 8, described below.

With continued reference to FIG. 2, the wireless device 112 may also include one or more types of removable storage 216 and one or more types of non-removable storage 218. Still further, the wireless device 112 can include communication components 220 for facilitating communication via wired and wireless communication networks, such as the wireless communication network 114 and network 118 (FIG. 1). As will be explained in greater detail below, the wireless device 112 can also include a communication management component 222 and associated data store 224 for processing wireless device information and user event information and determining communication events based on anticipated unavailability for the wireless device to exchange information via the wireless communication network. The communication management component 222 may further be operative to generate requests to the communication management system 102 (FIG. 1) for a set of data based on a determination of a communication event. The communication event may correspond to the anticipated unavailability for the wireless device to exchange information via the wireless communication network. The above-enumerated list of modules is representative and is not exhaustive of the types of functions performed, or modules implemented, by the wireless device 112. One skilled in the relevant art will appreciate that additional or alternative components may also be included in the wireless device 112 to carry out other intended functions such as for an electronic book reader or a mobile telephone.

Figure 3A:
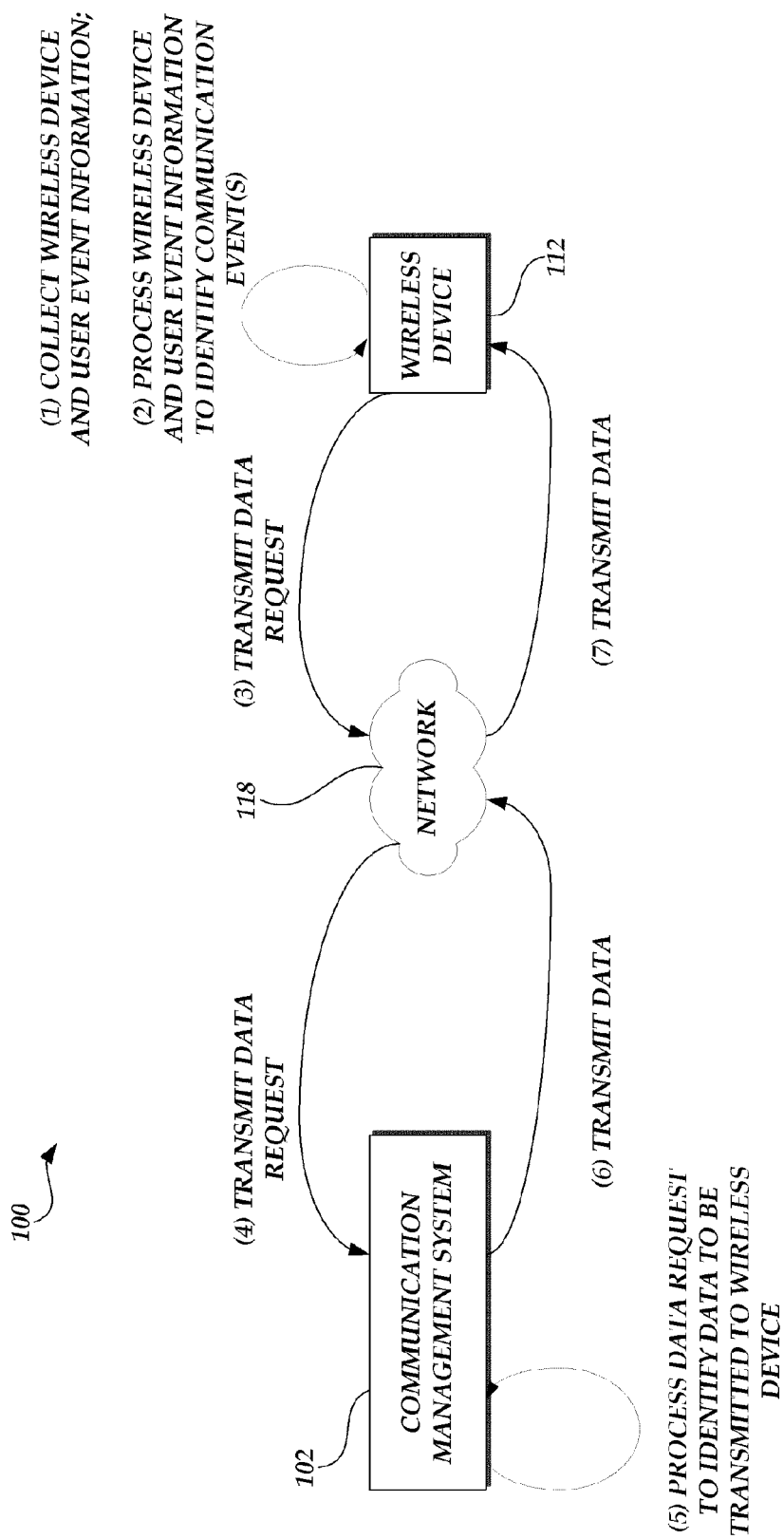
FIGS. 3A and 3B are block diagrams of the wireless device communication environment of FIG. 1 illustrating various embodiments for the collection and processing of wireless device information and user event information to determine anticipated wireless device communication events and to transmit a set of data based on anticipated wireless device communication events.
Figure 3B:
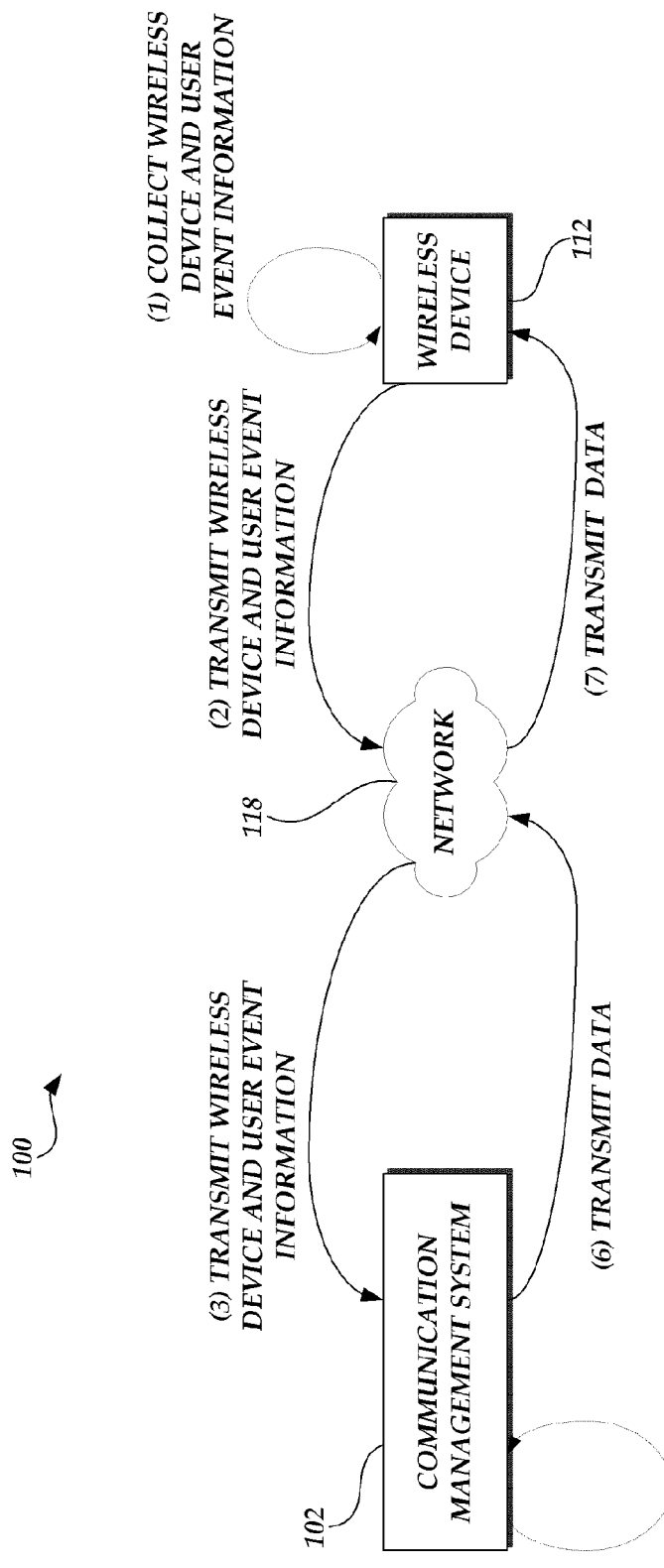

With reference to FIGS. 3A and 3B, the interaction between the various components of the wireless device management environment 100 (FIG. 1) will be described. With reference to FIG. 3A, in one embodiment, the wireless device 112 collects the wireless device information and user event information and processes the collected information to determine communication events. As previously described, the wireless device information and user event information can correspond to a variety of information including, but not limited to, wireless device performance metrics, wireless device location information, and the like. The wireless device information and user event information can also correspond to user interaction information associated with commands/controls initiated or manipulated by a user. Examples of user interaction include, but are not limited to, selection of a power off switch or power off function, disabling a communication component, such as a wireless modem, etc., selecting a limited communication mode on the wireless device, and the like. The wireless device information and user event information can also include additional external information, such as user profile or preference information, user calendaring information, and the like. The additional external information may be stored locally on the wireless device 112 or accessed from a network data source 120 (FIG. 1) via a communication network, such as network 118.

Based on the collected wireless device information and user event information, the wireless device 112, through the communication management component 222 identifies a communication event corresponding to a determination of anticipated unavailability of the wireless device to exchange data via the communication network prior to the anticipated unavailability, such as by generating a data request to the communication management system 102. For example, the communication management component 222 may determine, based on geographic location information associated with a wireless device 112 and communication event processing information, that the wireless device is in proximity to a known location associated with a communication event, such as an airport, hospital, and the like. In an illustrative embodiment, the data request can correspond to the transmittal of an identification of previously scheduled or anticipated data transfers known to the wireless device 112 and a request to transmit the corresponding data in advance of the anticipated unavailability for the wireless device to exchange information via the wireless communication network. In another embodiment, the data request can correspond to the transmittal of a notification of the communication event to the communication management system 102 and a data request for data that is not currently scheduled for transmission to the wireless device, but that may be available for transmission. For example, if the anticipated unavailability of the wireless device to exchange information via the wireless communication network is based on an event specified in calendaring information (e.g., a meeting scheduled with the user's manager), the data request can correspond to a request to transfer any content (or the most up-to-date content) using the subject matter or other keywords of the event as search criteria. In an illustrative embodiment, the request event can also be associated with a time frame for anticipated wireless device communication unavailability to determine which data transmissions would be potentially affected by the anticipated communication unavailability.

Upon receipt of the data request from the wireless device 112, the communication management system 102 processes the data request and attempts to identify information responsive to the data request. The communication management system 102 may verify the determination of the communication event and/or may also provide additional processing of the wireless device information and user event information to make additional determinations of communication events. The communication management system 102 may also obtain additional external information from network data sources 120 for use in determining communication events and/or to identify data responsive to the data request. For example, the communication management system 102 may obtain user profile information from a network resource 120 that includes historical information regarding previous data requests from the identified user.

If there is data to be transmitted, the communication management system 102 transmits, or otherwise initiates the transmission of, the set of data to the wireless device 112 responsive to the communication event. In an illustrative embodiment, the determination of the communication event should provide a sufficient amount of time such that at least part of the transmission of the set of data will be completed prior to the actual unavailability of the wireless device to exchange information via the wireless communication network. For example, the communication management component 222 can utilize estimated, measured, or blended bandwidth and data download rates to determine a target amount of time needed to obtain completed typical data transmissions to or from a wireless device. However, in the event that the wireless device 112 is already unavailable, the wireless device becomes unavailable, or the wireless device information and user event information changes or is otherwise updated, the communication management system 102 may terminate or modify the transmission.

With reference now to FIG. 3B, in another embodiment, the wireless device 112 collects the wireless device information and user event information and transmits at least some of the collected wireless device information and user event information to the communication management system 102 for processing to determine communication events. As illustrated in FIG. 3B, wireless device 112 collects wireless device information and user event information. As previously described, the wireless device information and user event information can correspond to a variety of information including, but not limited to, wireless device performance metrics, wireless device location information, and the like. The wireless device information and user event information can also correspond to user interaction information associated with commands/controls initiated or manipulated by a user on the wireless device 112. Examples of user interaction include, but are not limited to, selection of a power off switch or power off function, disabling a communication component, such as a wireless modem, etc., selecting a limited communication mode on the wireless device, and the like.

Upon collection of the wireless device information and user event information or after a pre-determined or threshold event, the wireless device 112 transmits the wireless device information and user event information to the communication management system 102. The communication management system 102 obtains the collected wireless device information and user event information and can also request additional information not provided by the wireless device 112, such as user profile or preference information, user calendaring information, and the like. The additional external information may be stored locally on the wireless device 112 or accessed from a network data source 120 (FIG. 1) via a communication network, such as network 118.

The communication management system 102, through the data processing component 108, then processes the wireless device information and user event information and/or the external information to identify a communication event corresponding to anticipated unavailability for the wireless device to exchange information via the wireless communication network. For example, the data processing component 108 may determine that based on geographic location information attributed to the wireless device 112, the wireless device is in proximity to an area in which the user has disabled the radio functionality of the device previously. Based on this previously observed behavior, the data processing component 108 can determine a communication event based on an anticipated unavailability for the wireless device to exchange information via the wireless communication network 114 (e.g., a repetition of the previously observed behavior).

Responsive to the determined communication event, the communication management system 102 then attempts to initiate information exchange with the wireless device 112 prior to the actual unavailability for the wireless device to exchange information via the wireless communication network 114. As previously described, the wireless device 112 can then transmit data via the wireless communication network to the communication management system 102 prior to the anticipated unavailability. As also previously described, the communication management system 102 can identify a variety of information to be included in the set of data transmitted to the wireless device 112. If there is data to be transmitted, the communication management system 102 transmits the set of data to the wireless device 112, or otherwise initiates the transmission of the set of data, based on the communication event. However, in the event that the wireless device 112 is already unavailable, the wireless device becomes unavailable, or the wireless device information and user event information changes, or is otherwise updated, the communication management system 102 may terminate or modify the transmission.

Figure 4:
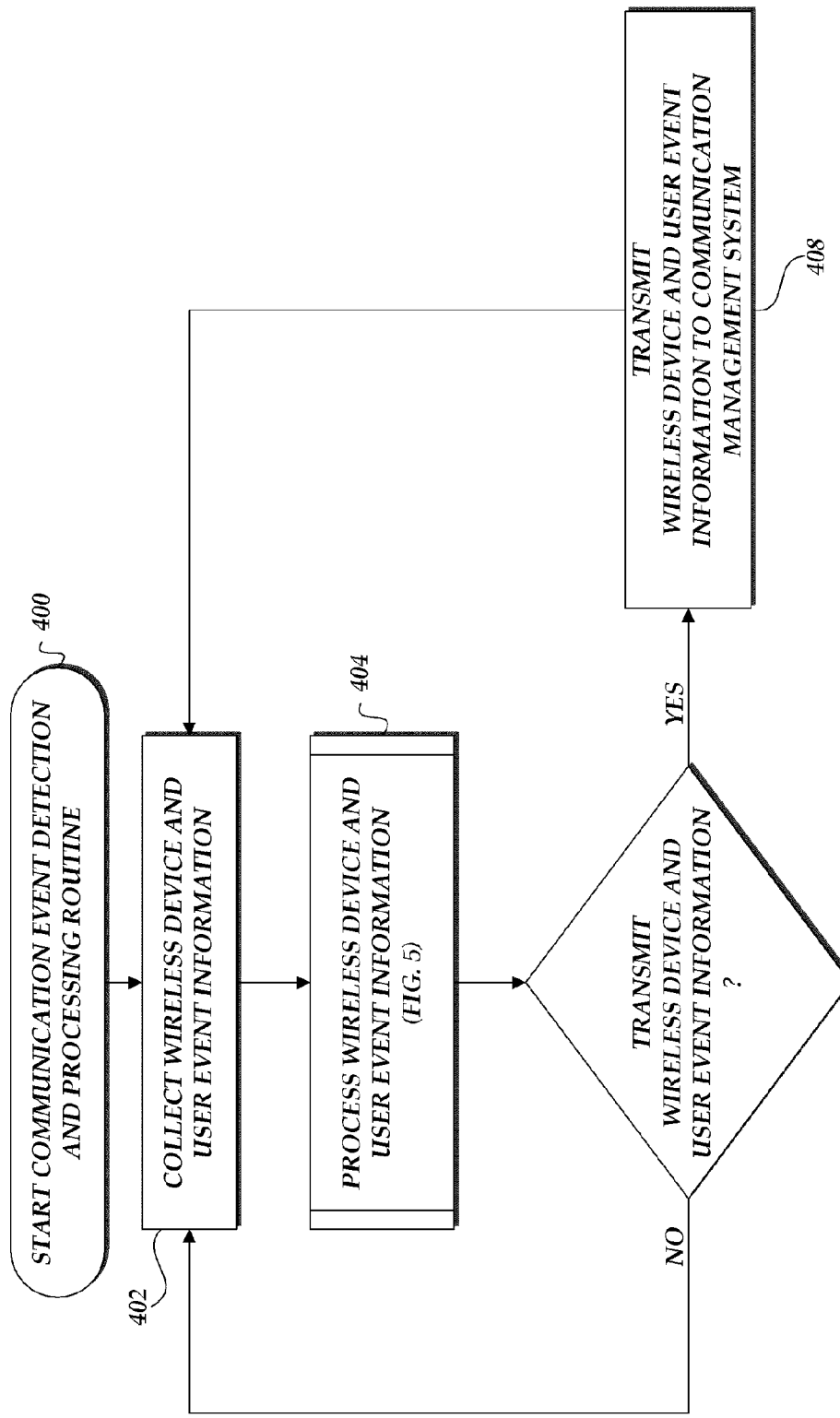
FIG. 4 is a flow diagram of a communication event detection and processing routine implemented by a wireless device for determining and processing anticipated wireless device communication events.

With reference now to FIG. 4, a flow diagram of a communication event detection and processing routine 400 implemented by the wireless device 112 (FIG. 1) for determining and processing anticipated wireless device communication events will be described. In an illustrative embodiment, routine 400 may be implemented by the communication management component 222 (FIG. 2) of the wireless device 112. At block 402, the wireless device 112 collects wireless device information and user event information. As previously described, in an illustrative embodiment, the wireless device information and user event information can correspond to performance metric information. The wireless device performance metric information can include various attributes of the wireless device 112 including battery power information, battery power consumption rates, wireless signal strength, overall wireless device health information, wireless device or ambient temperature values, and the like. In an illustrative embodiment, the performance metric information may be generated by hardware components (e.g., sensors) or software components on the wireless device 112. Additionally, the performance metric information may be obtained by the wireless device 112 from external resources, such as attached hardware components, remote monitoring components/services or network-based information sources 120.

In another embodiment, the wireless device information and user event information can correspond to various geographic location information associated with a current geographic location of the wireless device. In one example, the geographic location information can correspond to information (such as latitude and longitude information or other geographic coordinate information) from a global positioning system ("GPS") or cellular positioning system (e.g., triangulation). As previously described, the geographic coordinate information may be provided by sensors/components that are integrated into the wireless device 112 or otherwise attached to the wireless device. Additionally, the geographic coordinate information may be obtained by the wireless device 112 from a number of external devices or network-based resources.

In another example, the geographic location information can be attributed to the wireless device based on a detected proximity to a known geographic location, such as wireless communication network infrastructure equipment (e.g., cellular transmission base station equipment). In such an embodiment, the location information of the known location may be previously known to the communication management component 222 and stored in the data store 224 or otherwise reported to the wireless device 112 as part of a communication protocol exchange. Accordingly, the wireless device 112 assigns, or otherwise associates, the geographic location information of the known location as its own location/position information once the communication management component 222 determines proximity to the known location.

In still a further example, the wireless device 112 or communication management system 102 may poll or receive the geographic location information from a wireless communication network service provider. In such an embodiment, the wireless communication network service provider can identify the location (or identity) of the network infrastructure equipment in communication with the wireless device. In all the above embodiments, the location information may be further processed by a network resource, such as a Web service, to translate location information into a different format and/or to generate additional location information, such as graphical overlays, etc.

In still a further embodiment, as described above, the wireless device information and user event information can also correspond to user interaction information associated with commands/controls initiated or manipulated by a user. Examples of user interaction include, but are not limited to, selection of a power off switch or power off function, disabling a communication component, such as a wireless modem, etc., selecting a limited communication mode on the wireless device, and the like. One skilled in the relevant art will appreciate that the user interaction events can correspond to physical interactions with the wireless device 112, voice or other interactive commands, remote interactions, and the like. For example, a user may access a network-based interface via the computing device 122 that facilitates remote interaction with the wireless device 112.

At block 404, the communication management component 222 of the wireless device processes the wireless device information and user event information to determine whether a communication event has occurred. As previously described, the communication event can correspond to an anticipated unavailability for the wireless device 112 to exchange information via the wireless communication network 114. An illustrative sub-routine for processing the wireless device information and user event information to determine communication events will be described below with regard to FIG. 5. In an illustrative embodiment, the communication management component 222 may process all of the collected wireless device information and user event information and make the sole determination of potential communication events. Alternatively, the communication management component 222 may work in conjunction with the data processing component 108 of the communication management system 102 in the processing of at least a portion of the wireless device information and user event information. In still a further embodiment, the data processing component 108 of the communication management system 102 may process all of the wireless device information and user event information. In such an embodiment, block 404 would be omitted.

With continued reference to FIG. 4, at decision block 406, a test is conducted to determine whether the wireless device information and user event information should be transmitted to communication management system 102 (FIG. 1). If so, the wireless device 112 transmits the collected wireless device information and user event information to the communication management system 102 at block 408. Once the wireless device information and user event information has been transmitted at block 408 or if the wireless device will not transmit any wireless device or user event information at decision block 406, routine 400 returns to block 402. In an illustrative embodiment, the wireless device 112 may automatically transmit all collected wireless device or user event information as a matter of course. In alternative embodiments, the wireless device 112 may only transmit collected wireless device or user event information upon receipt of a request from the communication management system 102 or upon the satisfaction of predefined criteria. Still further, the wireless device 112 may store collected wireless device information and user event information and transmit the collected information as part of a batch process.

Figure 5:
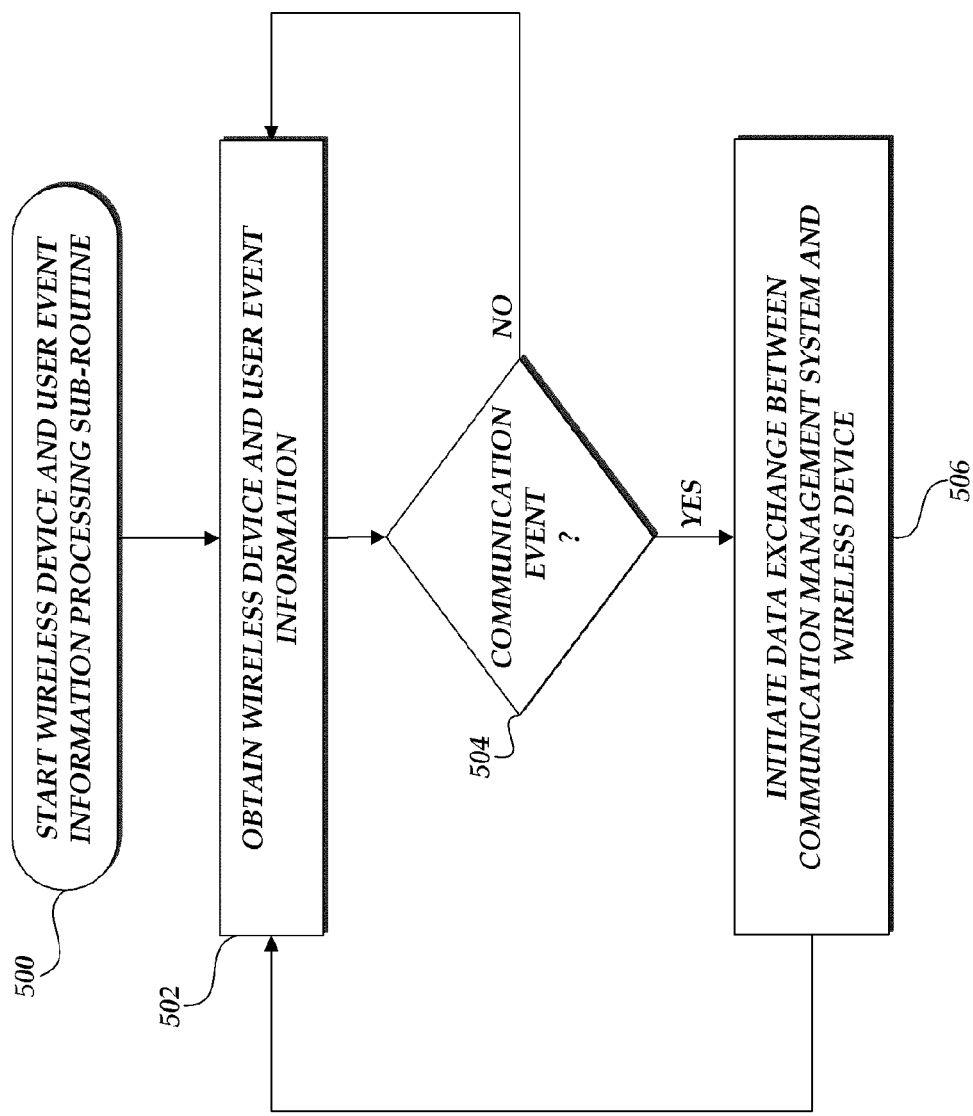
FIG. 5 is a flow diagram of a wireless device information and user event information processing sub-routine for determining communication events based on wireless device information and user event information implemented by a data processing component.

With reference now to FIG. 5, a flow diagram of a wireless device information and user event information processing sub-routine 500 will be described. In an illustrative embodiment, the sub-routine may be implemented by any number of data processing components, such as communication management component 222 (FIG. 2) as described in block 404 (FIG. 4). Additionally, the sub-routine 500 may be implemented by the data processing component 108 of the communication management system 102, as will be described below with regard to FIG. 6. For illustrative purposes, however, sub-routine 500 will be described with regard to a more generic "data processing component."

At block 502, the data processing component obtains the wireless device information and user event information. In an illustrative embodiment, the wireless device information and user event information may be previously collected and stored on the wireless device 112 for processing. In another embodiment, the collected wireless device information and user event information may be transmitted to the communication management system 102 for processing. At decision block 504, a test is conducted to determine whether a communication event has occurred. In an illustrative embodiment, the communication event corresponds to an anticipated unavailability for the wireless device to exchange information via the wireless communication network. The actual test utilized by the data processing component will depend on the type of wireless device information and user event information that is available and/or the specific configurations/settings of the data processing component. For example, the data processing component may have various settings that establish proximity ranges for processing location-based wireless device information and user event information. In another example, the data processing component may not utilize calendar information to process the wireless device information and user event information if user calendar event data is not available or becomes unreliable.

With regard to wireless device performance metric information, the data processing component (such as data processing component 108 or communication management component 222) may utilize various thresholds that can be compared to current wireless device performance metrics to determine whether a communication event has occurred. For example, the data processing component (such as communication management component 222 or data processing component 108) may utilize minimum thresholds for battery power levels or wireless signal strength such that an actual value below the minimum threshold would be indicative, alone or in combination with another attribute, of anticipated wireless communication unavailability. In another example, the data processing component may utilize maximum thresholds for battery power consumption rates, processing device resource utilization, network bandwidth utilization, etc. If the thresholds are exceeded, or otherwise met, the communication management component 222 can determine that a communication event has occurred based on consideration of the processing of the single piece of wireless device data. Alternatively, the data processing component may look to other wireless device or user event information prior to determining a communication event.

With reference to the previous examples, assume that the wireless device has a power conservation mode that disables the wireless communication functionality once the device falls below a minimum power level threshold (e.g., below 33%). To facilitate the transmission of content prior to such unavailability, the data processing component could establish one or more communication event thresholds related to battery power values that would be just above the above mentioned minimum power level threshold (e.g., 40%), power consumption rates and/or average user power consumption to determine a communication event indicative of the likelihood the wireless device 112 will fall below the minimum power threshold and become unavailable. In one aspect, the data processing component may not necessarily determine a communication event just from processing the communication event threshold. For example, in conjunction with historical user power consumption rates indicative of a likely continued drain on the power source, the data processing component could initiate a data exchange to transmit/obtain as much content as possible prior to the device entering the power conservation mode.

With regard to wireless device information and user event information corresponding to geographic or location information, the data processing component may determine whether the current geographic or location information associated with the wireless device 112 is within proximity of a set of known geographic locations or geospatial areas. As previously described with regard to FIG. 4, the current wireless device geographic location information may be collected, or otherwise calculated, in a number of different ways. The set of known geographic locations or geospatial areas may correspond to specific geographic location processing criteria or geospatial area processing criteria that are determined to be associated with a communication event if the current wireless device geographic location is within proximity to such processing criteria. For example, geospatial area processing criteria (or geographic location processing criteria) corresponding to a hospital may be determined to be associated with a communication event. Accordingly, if the current wireless device geographic location is within proximity of the hospital geospatial area processing criteria, a communication event can be determined because the wireless device will be unlikely to exchange information via a wireless communication network. Such a predetermination may be made in light of hospital regulations preventing (or limiting) wireless communications, a user's personal preferences, or the observed behavior of users.

As stated above, the geospatial area processing criteria may also be determined, based on a model of previous observations, to be associated with anticipated unavailability for the wireless device 112 to exchange information via the wireless communication network 114. In an illustrative embodiment, such a model of observed behavior may be based on the tracking and storage of the actions/behavior of an identified user. In another embodiment, the model of previous observations may be based on a collection of tracked behaviors for a set of users. For example, the geospatial area processing criteria corresponding to a destination (such as a beach, park, tourist stop, etc.) may be defined based on the observed behavior of individual users. Alternatively, the geospatial area processing criteria defining a destination may be based on the cumulative observed behavior of a group of users. The set of known geographic location processing criteria or geospatial area processing criteria may be stored in a data store, such as data store 110 (FIG. 1) or data store 224 (FIG. 2) in a variety of formats. Additionally, the data processing component can utilize any one of a number of traditional geospatial or geographic data processing methodologies to determine proximity of the current wireless device geographic location to the set of known geographic location processing criteria or geospatial area processing criteria.

As previously described, if a proximity is detected to geographic location processing criteria or geospatial area processing criteria, or such criteria is otherwise met, the data processing component can determine that a communication event has occurred based on consideration solely of the geographic location processing criteria or geospatial area processing criteria. Alternatively, the data processing component may look to a sequence or combination of wireless device or user event information in addition to the geographic location processing criteria or geospatial area processing criteria prior to determining a communication event. In another illustrative example, assume that the data processing component has determined that the wireless device is within proximity to a hospital or clinic. In some scenarios, proximity to a hospital having strict wireless communication policies may be sufficient to be determined a communication event and initiate an exchange of information prior to the user's arrival at the hospital. In other scenarios, proximity to a clinic may not be sufficient by itself to be determined a communication event. However, in conjunction with user calendaring information indicative of a calendar event corresponding to a doctor's appointment, the data processing component can determine the communication event and begin the information exchange prior to the user arriving at the doctor's office and powering down the wireless device 112.

Figure 7:
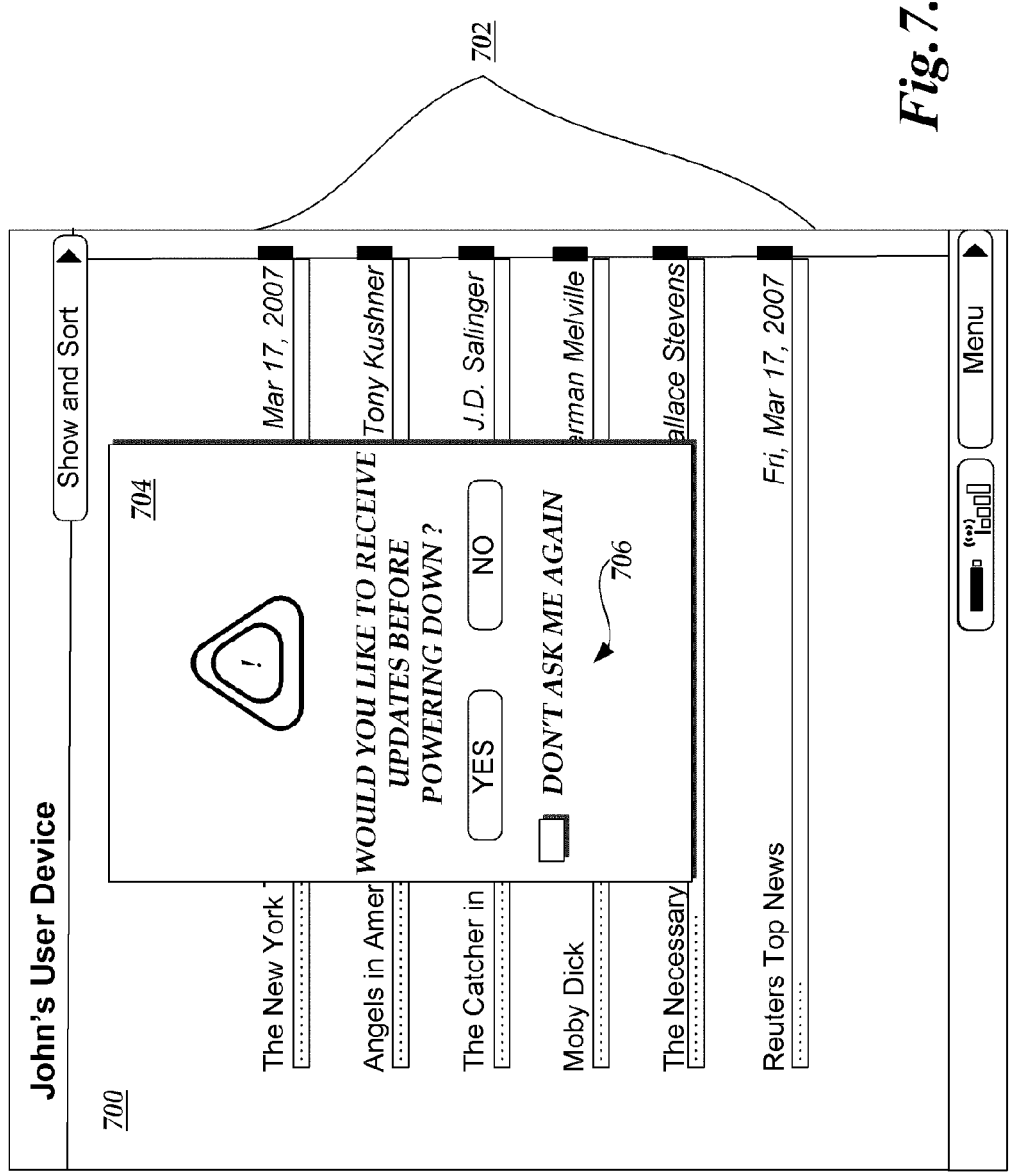
FIG. 7 is an illustrative screen rendering generated on a wireless device for obtaining user interaction information associated with anticipated wireless device communication events.

With regard to the wireless device information and user event information that corresponds to user interaction information associated with commands/controls initiated or manipulated by a user, the data processing component can maintain a set of user interactions that can be matched, singularly or in combination, to determine a communication event. For example, FIG. 7 is a block diagram of an illustrative screen rendering 700 generated by a wireless device in response to user interaction to power down the device. The screen rendering 700 includes typical display objects 702 that correspond to menus, rendered content, etc. typically generated by a wireless device 112, such as a wireless electronic book reader. In the event a user indicates a desire to initiate an action that may result in the actual unavailability for the wireless device 112 to exchange information via the wireless communication network 114, the screen display 700 can include a notification 704 for requesting authorization to check for scheduled transmissions, updates or other available data transmissions prior to rendering the wireless device 112 unavailable to exchange data. The notification 704 may further include controls 706 for confirming a user's intent to receive content prior to carrying out the user interaction. If such a confirmation is received, the wireless device 112 would likely delay the initiation of the user request (e.g., delay the user initiated powering off of the wireless device 112) to allow the wireless device to receive additional data.

Returning to FIG. 5, as previously described, the determination of a communication event at decision block 504 can be based on processing individual user interactions against a set of stored user interactions defining communication events. Alternatively, the determination of a communication event can be based on a sequence of user interaction events or a single user interaction event in combination with other wireless device or user event information. With reference to the previous example, the data processing component would not determine that a communication event has occurred until the data processing component receives the user interaction information indicative of a user powering off the device. For example, the confirmation generated from the screen rendering 700 (confirming that the user would like for the content to be updated on the wireless device 112 (FIG. 7)) would also be considered user event information utilized in the determination of a communication event.

With regard to user event information that corresponds to external user information, such as user profile information, user calendaring information or user preference information, the data processing component may determine communication events as a function solely of the additional information or as a function of the additional information in combination with other wireless device or user event information. For example, the data processing component may obtain calendar event information in which a user has specifically labeled the event as having "communication unavailability." In another example, the data processing component may determine a communication event based on anticipated unavailability for the wireless device to exchange information via the wireless communication network due to airline travel only if the data processing component can combine wireless device 112 proximity to a known geographic location (e.g., an airport) with travel profile information or calendaring data indicating some type of travel event or user unavailability. Such a combination would prevent the data processing component from determining a communication event for a user who is merely transitory to the location or is not intending on traveling. The criteria for processing the external user information and/or the collected user information may be stored in a data store such as data store 110 (FIG. 1) or data store 224 (FIG. 2).

At block 506, the data processing component initiates data exchange between the communication management system 102 and the wireless device 112 or otherwise executes components/routines for facilitating such communication exchanges. Thereafter, the sub-routine 500 can terminate or loop back to block 502 to anticipate the next request for processing wireless device or user event information.

In one embodiment, the information exchange can correspond to various data/information that the wireless device 112 transmits to the communication management system 102, or other network resource 120. As previously described, the wireless device 112 transmits a variety of data including data to be transmitted (such as user generated documents/tags/annotations), electronic communications (e.g., electronic mail, SMS messages, etc.), wireless device performance information, wireless device diagnostic information, and the like.

In another illustrative embodiment, the information exchange corresponds to a set of data/information to be transmitted to the wireless device 112 from the communication management system 102 or from another network resource 120 (as initiated by the communication management system). The set of data can correspond to any known or scheduled data requests that have yet to be transferred to the wireless device 112 and may be scheduled for transfer to the wireless device in the future. For example, the set of data may correspond to data, such as a periodical or other collection of data, that a user has configured for delivery at a specific time or upon satisfaction of criteria (e.g., the close of the trading day). In another example, the set of data can also correspond to information that is scheduled to be delivered to wireless device 112 to minimize bandwidth costs (e.g., in view of different bandwidth pricing tiers) or to obtain maximum available network bandwidth.

In another embodiment, the set of data corresponds to data/information that was not previously scheduled to be transmitted to the wireless device 112, but that may be identified as desirable to be transmitted to the wireless device. For example, the detection of a communication event can be utilized as a "trigger" to search for available software updates.

In still a further example, the set of data can include additional data, such as recommendations and advertisements, that can be transmitted to the wireless device as well. The advertisements/data may be based on additional information the communication management system 102 obtains from an external data store, such as profile information maintained by a network resource. The advertisements/recommendations may also be based, at least in part, on the cause of the communication event. For example, if the anticipated wireless communication unavailability is based on a lower power supply level, recommendations/advertisements may be based on power or may even be directed to a larger capacity power supply for the wireless device 112. One skilled in the relevant art will appreciate that the recommendations/advertisements may be generated directly by the communication management system 102 or otherwise obtained from a network resource, such as a Web service.

In an alternative embodiment, the data processing component may also attempt to mitigate the effects of the anticipated communication event based on anticipated unavailability for the wireless device 112 to exchange information via the wireless communication network 114. In one aspect, the data processing component may attempt to obtain alternative wireless communication network connectivity by selecting a different wireless network service provider. In another aspect, the data processing component may attempt to acquire (or instruct the wireless device to acquire) a different wireless network connection (e.g., from a cellular wireless network connection to a WiFi wireless network connection). In still a further aspect, the data processing component may instruct the wireless device to attempt to acquire communication connections to other wireless devices to facilitate a peer-to-peer connection. In such an aspect, wireless devices 112 may interact with each other to make additional content available until the wireless devices are again available to communicate via the wireless communication network.

In still a further aspect, the data processing component may provide a user with a notification of the anticipated wireless network unavailability to elicit additional user interaction, such as configuring an alternative wired network connection, connecting the wireless device 112 to a power supply to charge the power source, or prompting a user with the opportunity to make an additional content request prior to the actual unavailability of the wireless device to exchange information via the wireless communication network 114.

In yet another aspect, the data processing component may adjust the communication event processing criteria such that the determination of the communication event should provide a sufficient amount of time for at least part of the exchange of data between the wireless device 112 and the communication management system 102 to be completed prior to the actual unavailability of the wireless device to exchange information via the wireless communication network. For example, the data processing component can utilize estimated, measured, or blended bandwidth and data download rates to determine an estimated throughput of data. In conjunction with historical data download sizes (based on either a model of a set of wireless devices or the historical data for a particular wireless device), the data processing component can factor a time required to complete the typical data transmission in determining a communication event. However, in the event that the wireless device 112 is already unavailable, the wireless device becomes unavailable, or the wireless device information and user event information changes or is otherwise updated, the communication management system 102 may terminate or modify the transmission.

Figure 8:
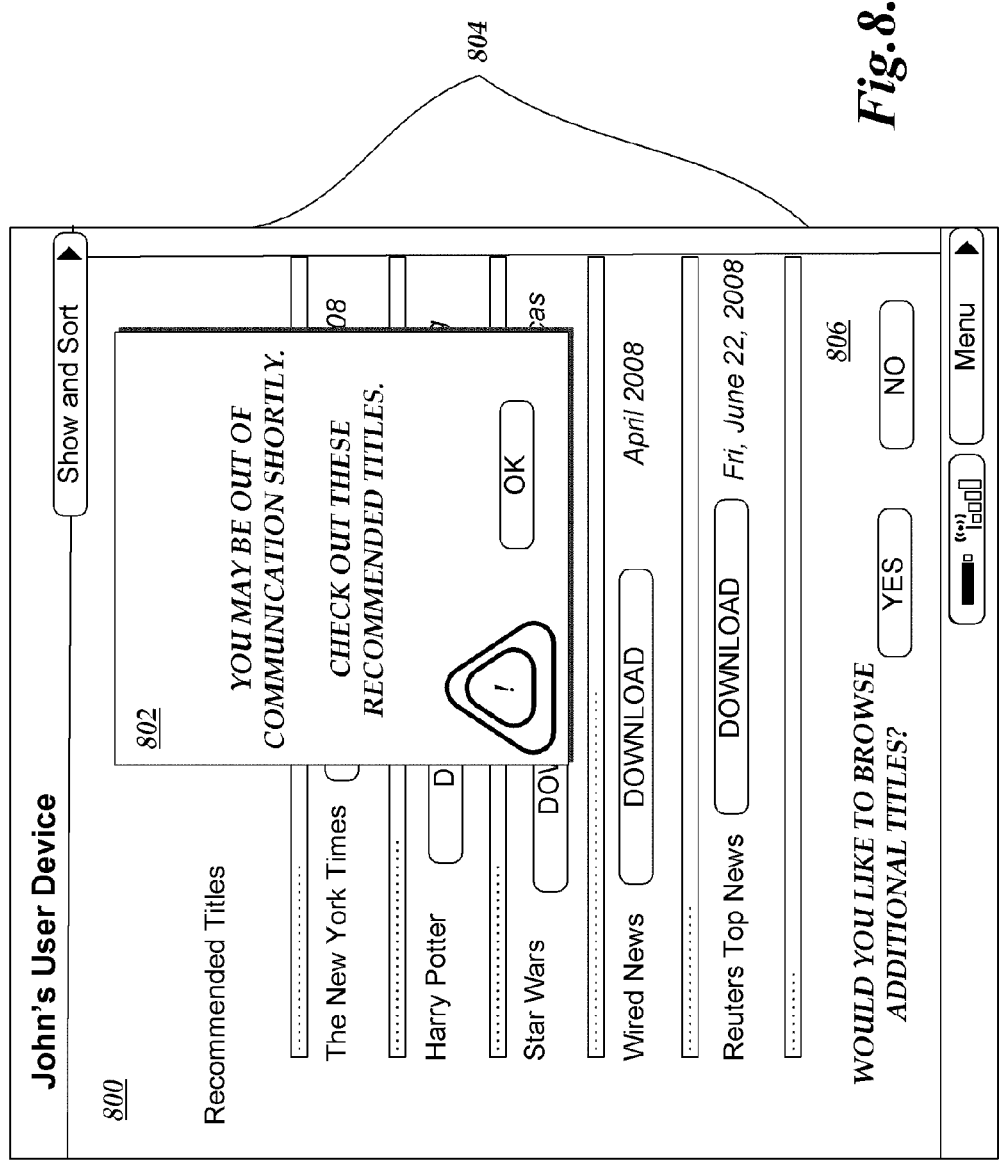
FIG. 8 is an illustrative screen rendering generated on a wireless device for obtaining user interaction information associated with anticipated wireless device communication events.

FIG. 8 is an illustrative screen rendering generated on a wireless device 112 for obtaining user interaction information associated with wireless device communication events. The screen rendering 800 includes a notification component 802 for notifying the user of the communication event and the anticipated unavailability for the wireless device to exchange information via the wireless communication network. The screen rendering 800 can also include a display portion 804 for providing to the user recommendations of additional content that may be available for download. As previously described, in an illustrative embodiment, the recommendations of available content may be based on the observed behavior of the user or previous selections as provided via user profile information. For example, a user may be recommended science fiction books based on previous download requests. In another example, a user may be recommended periodicals based on proximity to a known destination (e.g., beach related periodicals based on proximity to a beach). In still a further example, the user may be recommended items based specifically on observed behavior prior to similar communication events (e.g., the downloading of cinema periodicals prior to arriving at a movie festival). The screen rendering 800 can further include controls 806 for confirming a user's intent to receive additional content or alternative recommendations/suggestions.

Figure 6:
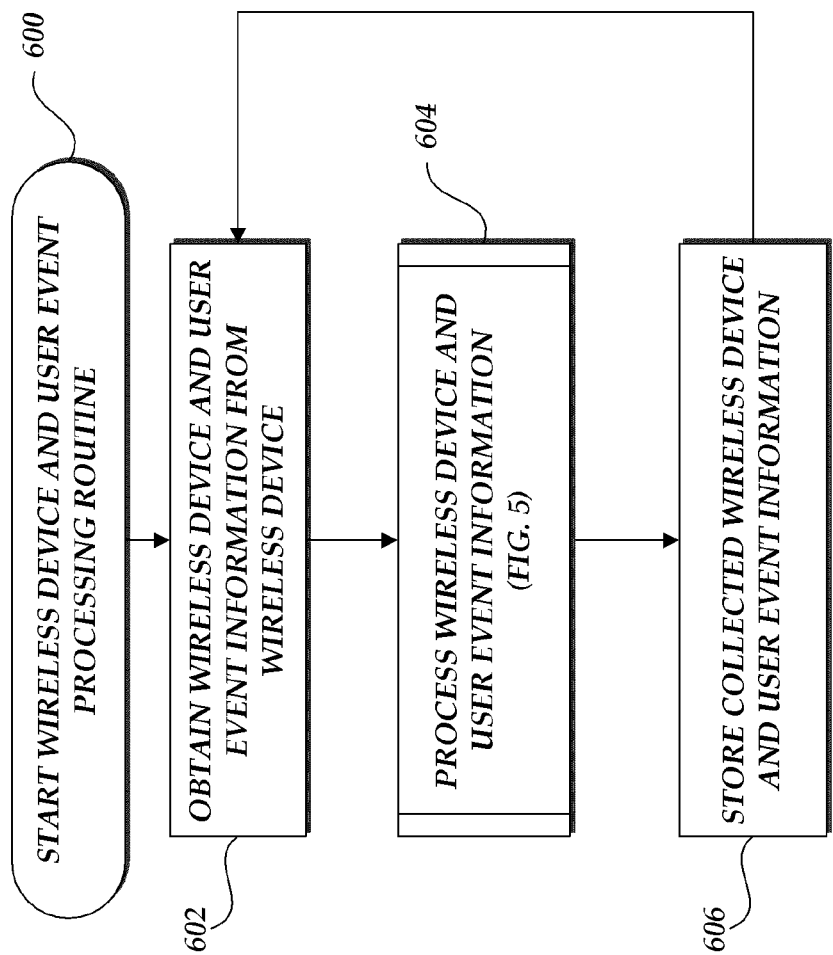
FIG. 6 is a flow diagram of a wireless device information and user event information processing routine implemented by a communication management system for determining and processing anticipated wireless device communication events.

With reference now to FIG. 6, a flow diagram of a wireless device information and user event information processing routine 600 implemented by a communication management system 102 for determining and processing communication events will be described. In an illustrative embodiment, routine 600 may be implemented by data processing component 108 (FIG. 1) of the communication management system 102. At block 502, the wireless device interface component 106 obtains wireless device information and user event information from a wireless device 112 (or other source). The range and variety of the collected wireless device information and user event information that can be used to determine communication events has been previously described with regard to FIG. 4. Additionally, in an illustrative embodiment, the communication management system 102 may obtain the same wireless device information and user event information or a different subset of wireless device information and user event information, or be the sole recipient of the wireless device information and user event information.

At block 604, the data processing component 108 processes the wireless device information and user event information to determine communication events. An illustrative sub-routine 500 for processing wireless device information and user event information was previously described with regard to FIG. 5 and may be utilized by the data processing component 108 as appropriate. At block 606, the data processing component 108 then stores the wireless device information and user event information to begin forming additional behavior models associated with wireless communication device unavailability information. The routine 600 then returns to block 602.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing communication comprising:
   a wireless device for collecting wireless device information and user event information;
   a data processing component for:
      determining a sequence of events based at least in part on current wireless device geographic location information and at least one of additional wireless device information or user event information;
      determining that a communication event is to occur based at least in part on the sequence of events,
         wherein the communication event corresponds to an anticipated unavailability of the wireless device to exchange information via a wireless communication network, and
         wherein the sequence of events is associated with a previous unavailability of the wireless device to exchange information via the wireless communication network; and
      scheduling transmission of a set of data to occur prior to the communication event, wherein the set of data corresponds to content to be transmitted to the wireless device independent of the communication event; and
   a communication management system for initiating the transmission of the set of data to the wireless device at the scheduled time.

2. The system as recited in claim 1, wherein the current wireless device geographic location corresponds to geographic coordinates associated with the wireless device.

3. The system as recited in claim 1, wherein the current wireless device geographic location corresponds to proximity of the wireless device to a known location.

4. The system as recited in claim 3, wherein geographic location information associated with the known location is previously stored by a data store accessible to the data processing component.

5. The system as recited in claim 3, wherein the current wireless device geographic location information is defined according to geographic location information of the known location.

6. The system as recited in claim 3, wherein the known location includes wireless communication network infrastructure equipment.

7. The system as recited in claim 1, wherein the data processing component is associated with the wireless device.

8. The system as recited in claim 1, wherein the data processing component is associated with the communication management system.

9. The system as recited in claim 8, wherein the wireless device transmits at least some collected wireless device information and user event information to the communication management system.

10. The system as recited in claim 1 further comprising a data store that maintains geographic location processing criteria or geospatial area processing criteria for determining communication events and wherein the determination of a communication event includes, at least in part, a determined proximity of the current wireless device geographic location to at least one of the geographic location processing criteria or geospatial area processing criteria.

11. The system as recited in claim 10, wherein the geographic location processing criteria or geospatial area processing criteria correspond to geographic location information associated with an airport.

12. The system as recited in claim 1, wherein the wireless device corresponds to a wireless electronic reading device.

13. The system as recited in claim 1, wherein the content to be transmitted to the wireless device corresponds to software to be executed on the wireless device.

14. The system as recited in claim 1, wherein the content corresponds to content to be displayed on the wireless device.

15. The system as recited in claim 1, wherein the content to be transmitted to the wireless device corresponds to multimedia content.

16. The system as recited in claim 1, wherein the content to be transmitted to the wireless device corresponds to content from a network resource.

17. A method of managing communication comprising:
   obtaining from a device at least one of device information or user event information;
   determining a sequence of events based at least in part on the at least one of device information or user event information;
   determining that a communication event is to occur based at least in part on the sequence of events, wherein the communication event is based on an anticipated unavailability of the device to exchange information via a communication network, and wherein the sequence of events is associated with a previous unavailability of the device to exchange information via the communication network; and causing, in response to determining the communication event, transmission of a set of data to the device prior to the communication event, wherein the set of data corresponds to content to be transmitted to the device independent of the communication event.

18. The method as recited in claim 17, wherein the at least one of device information or user event information includes external information corresponding to an identifiable aspect of the device.

19. The method as recited in claim 18, wherein the external information corresponds to geographic location information associated with a current geographic location of the device.

20. The method as recited in claim 18, wherein the external information corresponds to user information associated with an identified user associated with the device.

21. The method as recited in claim 20, wherein the user information corresponds to user calendaring information.

22. The method as recited in claim 21 further comprising:
generating search criteria based on extracted subject matter information from the user calendaring information; and
wherein transmitting a set of data to the device responsive to the determination of the communication event includes:
identifying the set of data corresponding to the search criteria; and
transmitting the set of data corresponding to the search criteria.

23. The method as recited in claim 17, wherein the at least one of device information or user event information includes device performance metrics.

24. The method as recited in claim 23, wherein the device performance metrics include device power attributes and wherein determining that the communication event is to occur is further based on a comparison of the device power attribute to a power attribute threshold.

25. The method as recited in claim 24, wherein the power attribute threshold corresponds to a minimum device power level.

26. The method as recited in claim 24, wherein the power attribute threshold corresponds to a rate of power consumption.

27. The method as recited in claim 23, wherein the device performance metrics include characteristics of a communication signal.

28. The method as recited in claim 23, wherein the device performance metrics include current device geographic location information.

29. The method as recited in claim 28, wherein determining that the communication event is to occur further comprises determining geographic proximity of the current device geographic location to a set of known locations associated with the anticipated unavailability of the device to exchange information via the communication network.

30. The method as recited in claim 29, wherein the set of known locations includes at least one known location in which a communication event will be determined if the current device geographic location is proximate to such known location.

31. The method as recited in claim 29, wherein the set of known locations include at least one known location in which a communication event will be determined if the current device geographic location is proximate to such known location and at least one additional device information or user event information is also determined to be indicative of a communication event.

32. The method as recited in claim 17, wherein the at least one of device information or user event information corresponds to user interaction information from the device.

33. The method as recited in claim 32, wherein the user interaction information corresponds to an indication to power down the device.

34. The method as recited in claim 32, wherein the user interaction information corresponds to an indication to disable a communication component on the device.

35. The method as recited in claim 17, wherein the content to be transmitted to the device corresponds to advertisement content responsive to the determination of a communication event.

36. The method as recited in claim 17 further comprising:
generating a model of communication events based on a processing of the at least one of device information or user event information; and
storing the model of the communication events.

37. A non-transitory computer-readable medium having computer-executable instructions for implementing the method recited in claim 17.

38. A method of managing communication comprising:
collecting at least one of device information or user event information;
determining a sequence of events based at least in part on the at least one of device information or user event information;
determining that a communication event is to occur based at least in part on the sequence of events,
wherein the communication event is based on an anticipated unavailability of at least one device to exchange information via a communication network, and
wherein the sequence of events is associated with a previous unavailability of at least one device to exchange information via the communication network; and
initiating, in response to determining the communication event, a communication exchange with a communication management system via the communication network such that the communication exchange is initiated prior to the communication event, wherein the communication exchange is configured to exchange information corresponding to content to be transmitted to the device independent of the communication event.

39. The method as recited in claim 38, wherein collecting at least one of device information or user event information from a device includes collecting device performance metrics.

40. The method as recited in claim 38, wherein collecting at least one of device information or user event information from a device includes collecting user interaction information from the device.

41. The method as recited in claim 40, wherein the user interaction information corresponds to an indication to power down the device.

42. The method as recited in claim 40 further comprising causing a delay in the powering down of the device until completion of the communication exchange responsive to the determination of a communication event.

43. The method as recited in claim 40, wherein the user interaction information corresponds to an indication to disable a communication component on the device.

44. The method as recited in claim 43 further comprising causing a delay in the disabling of the communication component on the device until completion of the communication exchange responsive to the determination of a communication event.

45. The method as recited in claim 38, wherein initiating a communication exchange with a communication management system responsive to the determination of the communication event includes:
   identifying any scheduled data transmissions corresponding to data to be transmitted to the device at a future time; and
   transmitting a request for a set of data corresponding to the scheduled data transmissions prior to the future time.

46. The method as recited in claim 38, wherein initiating a communication exchange with a communication management system responsive to the determination of the communication event includes transmitting a notification of the determination of a communication event to a communication management system.

47. The method as recited in claim 38 further comprising:
   generating a notification to a user of the determination of a communication event; and
   prompting the user to make additional requests for content prior to the unavailability of the at least one device to exchange information via a communication network.

48. A non-transitory computer-readable medium having computer-executable instructions for implementing the method recited in claim 38.

49. A system for managing communication comprising:
   a data store operable to maintain communication event processing data corresponding to criteria for determining communication events based on an anticipated unavailability of a device to exchange information via a communication network;
   a computing device in communication with the data store and that is operative to:
      determine a sequence of events based at least in part on at least one of device information or user event information; and
      determine that communication events is to occur based on a comparison of the sequence of events with the communication event processing data in the data store, wherein the sequence of events is associated with a previous unavailability of the device to exchange information via the communication network; and
      initiate, in response to determining a communication event, an information exchange with the device without any user interaction such that the information exchange occurs prior to the communication event, wherein the information exchange is configured to exchange information corresponds to content to be transmitted to the device independent of the communication event.

50. The system as recited in claim 49, wherein the computing device is further operative to identify a set of data scheduled to be delivered to the device at a scheduled time and to request the set of data at a time prior to the scheduled time.

51. The system as recited in claim 49, wherein the computing device is further operative to obtain external data corresponding to an identifiable aspect of the device.

52. The system as recited in claim 49, wherein the external data corresponds to calendaring information.

53. The system as recited in claim 52, wherein the computing device utilizes the calendaring information to determine a communication event.

54. The system as recited in claim 49, wherein the data store maintains data models of previous communication events.

55. The system as recited in claim 49, wherein the computing device determines that communication events is to occur further based on a comparison of the at least one of device information or user event information with the data models in the data store.

56. The system as recited in claim 49, wherein the at least one of device information or user event information corresponds to device performance metric thresholds.

57. The system as recited in claim 49, wherein the communication event processing data corresponds to geographic location information of known locations.

58. The system as recited in claim 57, wherein the computing device is operative to determine communication events based on a detection of proximity of a current device geographic location to the geographic location information of at least one of the known locations.

59. The system as recited in claim 57, wherein the computing device is operative to determine communication events based on a time estimated for the device to exchange information via the communication network.

60. A non-transitory computer-readable medium having computer-executable components comprising instructions stored therein for implementing, in one or more processors, operations for managing communication, the components comprising:
   an interface component for obtaining at least one of device information or user event information collected from a device;
   a data processing component for determining a sequence of events based at least in part on the at least one of device information or user event information and for determining that a communication event is to occur based on the sequence of events,
      wherein the communication event corresponds to an anticipated unavailability of the device to exchange information via a communication network, and
      wherein the sequence of events is associated with a previous unavailability of the device to exchange information via the communication network; and
   a communication component for initiating transmission of a set of data to the device such that the transmission occurs prior to the communication event, wherein the set of data corresponds to content to be transmitted to the device independent of the communication event.

61. The non-transitory computer-readable medium as recited in claim 60 further comprising an external data source interface component for obtaining external data corresponding to an identifiable aspect of the device.

62. The non-transitory computer-readable medium as recited in claim 61, wherein the identifiable aspect of the device corresponds to user information of a user associated with the device.

63. The non-transitory computer-readable medium as recited in claim 62, wherein the user information corresponds to calendaring information.

64. The non-transitory computer-readable medium as recited in claim 63, wherein the external data source interface component extracts search criteria from the calendaring information and wherein the data processing component utilizes the search criteria to identify a set of data to be transmitted to the device responsive to the determination of a communication event.

65. The non-transitory computer-readable medium as recited in claim 60, wherein the data processing component determines that a communication event is to occur further based on a comparison of the at least one of device information or user event information with data models of previous communication events.

66. The non-transitory computer-readable medium as recited in claim 60, wherein the data processing component determines that a communication event is to occur further based on a comparison of a device performance metric threshold with the at least one of device information or user event information.

67. The non-transitory computer-readable medium as recited in claim 60, wherein the data processing component determines that a communication event is to occur further based on a determination of proximity of a current device geographic location to at least one of geographic location processing criteria or geospatial area processing criteria.

68. The non-transitory computer-readable medium as recited in claim 60, wherein the interface component and the data processing component are executed at the device.

69. The non-transitory computer-readable medium as recited in claim 60, wherein the interface component and the data processing component are executed at a communication management system.

70. The non-transitory computer-readable medium as recited in claim 60, wherein the data processing component is further operable to determine a time estimated for the device to exchange information via the communication network.

71. The non-transitory computer-readable medium as recited in claim 70, wherein the data processing component is further operable to determine that the communication event is to occur further based on a function of the time estimated for the device to exchange information via the communication network.

* * * * *

UNITED STATES PATENT AND TRADEMARK OFFICE
CERTIFICATE OF CORRECTION

PATENT NO.         : 9,386,427 B1
APPLICATION NO.    : 12/180325
DATED              : July 5, 2016
INVENTOR(S)        : Subram Narasimhan et al.

Page 1 of 1

It is certified that error appears in the above-identified patent and that said Letters Patent is hereby corrected as shown below:

On the Title Page

Item (75), Line 2, from "Girish Bausilal Bajaj" to --Girish Bansilal Bajaj--.

Signed and Sealed this
Seventeenth Day of March, 2020

Andrei Iancu
*Director of the United States Patent and Trademark Office*